Jan. 1, 1963 J. HOLZER ETAL 3,071,733

TIME CORRECTING REGENERATIVE PULSE REPEATER

Filed Sept. 13, 1960 2 Sheets-Sheet 1

INVENTORS,
JOHANN HOLZER
HORST WOLF.

BY Jack H. Linscott

ATTORNEY

INVENTORS,
JOHANN HOLZER
HORST WOLF.
BY Jack N. Linscott
ATTORNEY.

United States Patent Office 3,071,733

Patented Jan. 1, 1963

3,071,733

TIME CORRECTING REGENERATIVE PULSE REPEATER

Johann Holzer, Elberon, N.J., and Horst Wolf, Costa Mesa, Calif., assignors to the United States of America as represented by the Secretary of the Army Filed Sept. 13, 1960, Ser. No. 55,811
5 Claims. (Cl. 328—164)
(Granted under Title 35, U.S. Code (1952), sec. 266)

The invention described herein may be manufactured and used by or for the Government for Government purposes, without payment of any royalty thereon.

The invention relates in general to repeaters for communication circuits and more particularly to time correcting regenerative repeaters for pulse type communication systems.

When a pulse code modulated signal is transmitted over a transmission medium, the shape of the pulses is distorted and the time intervals between pulses are changed due to the characteristic of the transmission medium and interferences from outside. The time correcting regenerative pulse repeater, as described below, restores the pulse shape and decreases time jitter of a pulse signal.

The repeater will be described in connection with a binary communication system which uses a bit rate of one million pulses per second (one pulse per microsecond) with a synchronizing pulse (sync pulse) every 25 microseconds. However, it is to be understood that the invention could be used in other types of binary pulse communication systems applying different bit rates. The sync pulses have the same shape as the signal pulses. The difference between sync pulses and signal pulses is: the sync pulses appear periodically every 25 microseconds, while the signal pulses do not have any periodicity.

The repeater described was designed for field wire, it should however be emphasized that the basic ideas are applicable to other transmission media as well.

The retiming effect of the repeater will be independent of the pulse density, that is, it will work as well with the maximum density (in this system about 50%) as it will work with only sync pulses transmitted.

The distortion of the pulse shape we have to expect will be due to the transmission characteristic of the line, low frequency cutoff because of transformers, and outside interference.

To avoid distortion by low frequency cutoff because of transformers the binary pulse trains consisting of unipolar pulses are converted into inverted binary pulse trains. By an inverted binary pulse train we mean a binary pulse train with every other one of the pulses inverted.

An object of the invention is to provide for restoring pulse shapes and decreasing any changes in time intervals between successive pulses.

Another object of the invention is to provide for regenerating a pulse of uniform amplitude and shape when the amplitude of an incoming pulse exceeds a certain trigger level.

Another object of the invention is to provide for regenerating a pulse of uniform amplitude and shape when the amplitude of an incoming pulse exceeds, by a certain amount, a proportion of the average value of all incoming pulses.

Another object of the invention is to provide for extracting the sync pulses from the incoming pulse train.

Another object of the invention is to provide for generating a timing pulse at a frequency of one megacycle per second and synchronizing it with the extracted sync pulses.

Another object of the invention is to provide for synchronizing the regenerated pulses of uniform amplitude and shape with the timing pulses. Other objects and a fuller understanding of the invention may be had by referring to the following description and claims, taken in conjunction with the accompanying drawings in which:

Figure 1:
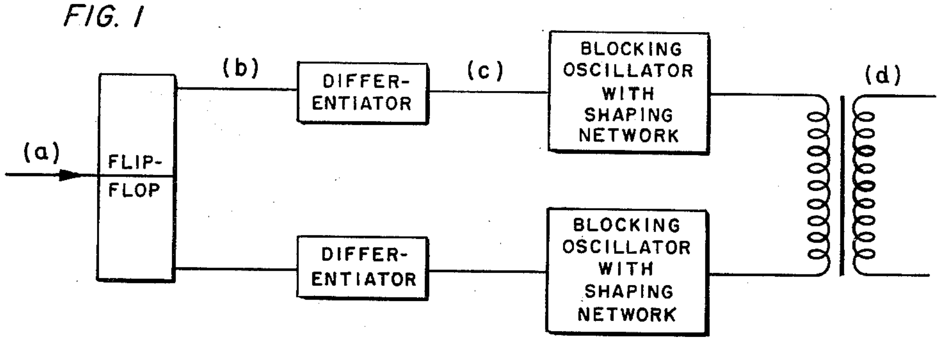
FIGURE 1 is a block diagram of a device for converting a unipolar binary pulse train into an inverted binary pulse train.
Figure 2:
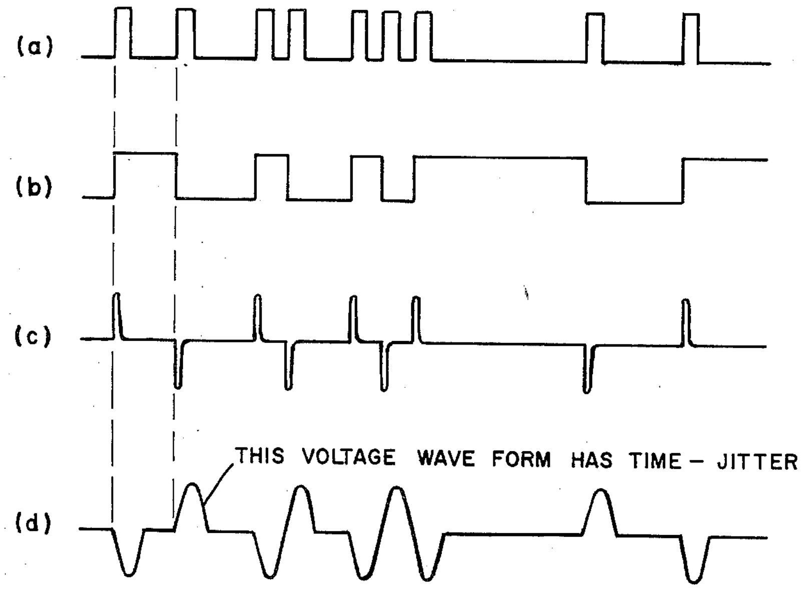
FIGURE 2 shows wave forms which appear at different designated points in the block diagram of FIGURE 1.

With reference to FIGURES 1 and 2 a unipolar pulse train of the form shown in FIGURE 2(*a*) is applied to the input of the flip-flop shown by FIGURE 1. The device shown by FIGURE 1 can be used anywhere in a communication system where there appears a unipolar signal and it is desired to convert it to an inverted binary signal. The upper output of the flip-flop will be of the form shown in FIGURE 2(*b*). The form of the lower output of the flip-flop will be exactly opposite the form shown in FIGURE 2(*b*). The upper differentiator will differentiate the voltage form shown in FIGURE 2(*b*) and obtain a voltage form shown in FIGURE 2(*c*). Only the negative pulses of FIGURE 2(*c*) will trigger the upper blocking oscillator and produce the positive pulses shown by FIGURE 2(*d*). The negative pulses of FIGURE 2(*d*) are produced by the lower blocking oscillator. The outputs of the two blocking oscillators are combined by the transformer to produce the voltage wave form shown in FIGURE 2(*d*). The voltage wave form shown by FIGure 2(*d*) is an inverted binary pulse train.

The inverted binary pulse train has no D.C. component since every other pulse cancels the D.C. originated by the foregoing one. The inverted binary pulse train is shaped to a pulse shape as shown in FIGURE 2(*d*) so it does not contain the unnecessary high frequency components of a rectangular pulse. These components are not necessary to convey information but would originate more near end crosstalk.

Figure 3:
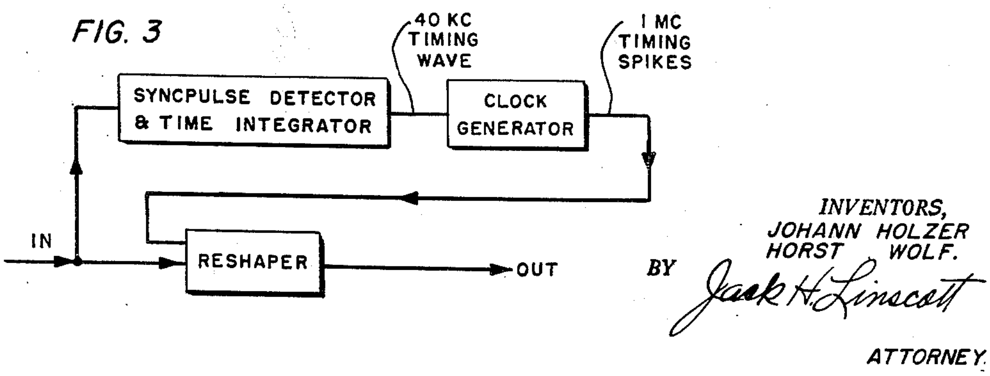
FIGURE 3 is a block diagram of a regenerative repeater in accordance with this invention.

With reference to FIGURE 3, the repeater consists of three different parts: a reshaper, a sync pulse detector and time integrator, and a clock generator. The sync pulse detector and time integrator detects the sync pulses out of the incoming pulse train, extracts and averages the timing information which they contain and generates a new 40 kc. timing wave. The new timing wave has reduced time jitter as compared to the incoming sync pulses. The clock generator produces 1 mc. spikes and is synchronized by the 40 kc. timing wave mentioned above. The reshaper reshapes the incoming pulse train. By super imposing the incoming pulse signals with the 1 mc. spikes which are produced by the clock generator a time jitter reduction of the reshaped output pulses is achieved.

Figure 4:
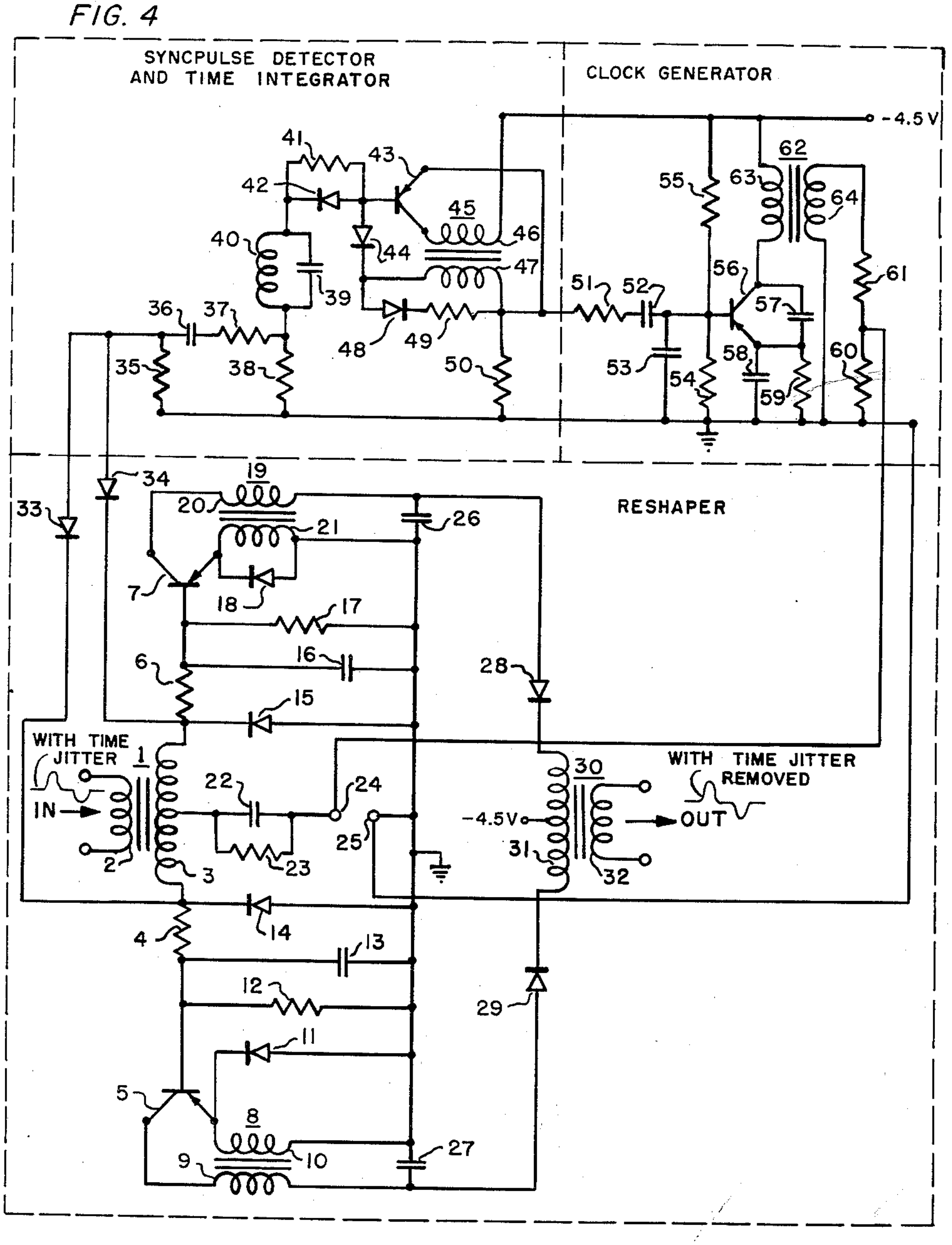
FIGURE 4 is a circuit diagram of the regenerative repeater.

With reference to FIGURE 4 the performance of the repeater will now be explained in somewhat greater detail. Inverted binary input pulses from the line are applied to primary winding 2 of transformer 1. The transformer 1 is also used to equalize the frequency characteristic of the line to a certain degree. The lower end of secondary winding 3 is connected to a blocking oscillator consisting of transistor 5, transformer 8, diode 11, resistors 4 and 12, and capacitors 13 and 27. The upper end of secondary winding 3 is connected to another blocking oscillator consisting of transistor 7, transformer 19, diode 18, resistors 6 and 17, and capacitors 16 and 26. Transistors 5 and 7 are PNP transistors. Capacitor 22 is connected to the center tap of secondary winding 3 and to terminal 24. Resistor 23 is connected in shunt with capacitor 22. The winding 9 of transformer 8 is connected through diode 29 to winding 31 of transformer 30.

The winding 20 of transformer 19 is connected through diode 28 to winding 31 of transformer 30.

Diodes 14 and 15 limit the input voltage and provide trigger pulses of constant amplitude to the bases of transistors 5 and 7. Thus the output pulse shape is independent of the input voltage. At the same time diodes 14 and 15 deliver a charging current to capacitor 22 which establishes an automatic bias voltage across capacitor 22. By proper adjustment of resistor 23 the trigger level of the blocking oscillators may be set to an optimum, usually to one-half of the peak amplitude of the input pulses. This adjustment should be done for the most probable pulse-density which will be expected in the system. In this way maximum possible security is guaranteed against undesired signals resulting from outside interferences. Capacitors 13 and 16 store energy which is necessary to provide transistors 5 and 7 with enough base current during triggering. For a similar purpose capacitors 26 and 27 are provided. At the moment of triggering capacitors 26 and 27 offer a low impedance voltage source for the collectors of transistors 5 and 7. In the moment of triggering *di/dt* in the feedback transformers 8 and 19 is limited only by the resistance of the transistors. Thus the ability of the blocking oscillators to decide whether an input pulse is above or below the trigger level is increased. The blocking oscillators either generate a standard output pulse or no pulse at all. If the negative pulses applied to the bases of the transistors are of sufficient amplitude standard output pulses will be generated and if not of sufficient amplitude no pulses will be generated. Diodes 28 and 29 prevent the transformer 30 from oscillating in connection with capacitors 26 and 27. Transformer 30 combines the regenerated pulses of both blocking oscillators again to an inverted binary pulse train. Between terminals 24 and 25 a gating voltage will be inserted. This gating voltage appears on the bases of the blocking oscillator transistors as superimposed on the input signal.

The incoming pulse signals suffer from an undesired time jitter. To reduce this time jitter it is necessary to obtain a jitter-free timing signal. This timing signal is derived from the incoming sync pulses. Since the sync pulses are subject to time jitter as well as any other pulse, the time intervals between succeeding sync pulses have to be averaged by integration. Thus corrected timing information is available. A tuned circuit controlled blocking oscillator is used to achieve this purpose. The tuned circuit consists of capacitance 39 and inductance 40 and the blocking oscillator consists of transistor 43 and feedback transformer 45. Transistor 43 is a PNP transistor. The line input pulses are rectified by diodes 33 and 34 which produce negative pulses across resistance 35. Capacitance 36, and resistances 37 and 38 form a voltage divider for the negative pulses which are produced across resistance 35. The pulses across resistance 38 are superimposed on the oscillations of the tuned circuit. The tuned circuit produces a sin-wave voltage at the cathode of diode 42. As soon as the sin-wave voltage becomes negative with respect to ground transistor 43 triggers. The sin-wave voltage together with the superimposed negative pulses which appear across resistance 38 determine the time in each cycle of the sin-wave voltage when transistor 43 triggers. The amplitudes of the pulses are small relative to the amplitude of the sin-wave voltage. The ideal situation is to have the pulses with amplitudes that will trigger the transistor immediately before the sin-wave voltage goes from positive to negative. If the amplitudes of the negative pulses are too great transistor 43 will be triggered too early in a cycle and time jitter will be introduced. If the amplitudes of the negative pulses are too small transistor 43 will not at all times be triggered by the pulses and the output of transistor 43 will not be in synchronism with the pulses. The purpose of capacitance 36, and resistances 37 and 38 is to effect a compromise between time jitter reduction and stability of synchronism. Capacitance 36, and resistances 37 and 38 provide the proper pulse amplitudes across resistance 38 so that a maximum time jitter reduction of the sync pulses is achieved but still the oscillations of the blocking oscillator are controlled by the incoming sync pulses. Since the base voltage of transistor 43 becomes negative immediately after being triggered, the tuned circuit is separated from the base by diode 42. This means that diode 42 connects the tuned circuit to the base of the transistor 43 only during the triggering instant. Diode 44 connects the base of transistor 43 to the secondary winding 47 of transformer 45 during the time that the transistor is conducting. Diode 48 prevents switch off transients of transformer 45 from reaching the base of the transistor and the tuned circuit and causes the remaining energy of the transformer to be dissipated in resistance 49. To maintain the oscillations of the tuned circuit a resistance 41 is used to feed energy from the triggered blocking oscillator back to the tuned circuit. The amount of energy fed back must equal the energy used by the blocking oscillator for triggering plus the energy consumed by the internal and external losses of the tuned circuit. The tuned circuit has to be tuned to a frequency which is just a little lower than the sync pulse repetition frequency (40 kc.) in order to insure proper starting of the circuit. Across resistor 50 a time jitter reduced 40 kc. timing wave is available, which has a discontinuity at the trigger moment of transistor 43. The timing wave across resistor 50 is applied through resistor 51 and capacitor 52 to the 1 mc. clock generator for the purpose of synchronizing it. The 1 mc. turned circuit consists of inductance 63 and capacitor 57. The spikes occurring in inductance 63 are transformed to inductance 64. Inductances 63 and 64 are respectively the primary and secondary windings of transformer 62. The negative 1 mc. pulses induced across secondary winding 64 are applied across resistances 60 and 61. The pulses appearing across resistance 60 are applied to terminals 24 and 25 of the reshaping device and superimposed on the incoming pulses. In this way the time jitter of the pulses at the output of the reshaping device is reduced. The feedback from the output of the clock generator to the input of the sync detector through the input transformer 1 of the reshaper helps to improve the time jitter reduction of the repeater.

Although we have described our invention with a certain degree of particularity, it is understood that the present disclosure has been made only by way of example and that numerous changes in the details of circuit and the combination and arrangement of circuit elements may be resorted to without departing from the spirit and the scope of the invention as hereinafter claimed.

What is claimed is:

1. A regenerative pulse repeater for regenerating binary pulse signals which consist of periodic sync pulses representing binary bits of information located between the sync pulses comprising, a reshaping network connected to receive said binary pulse signals for regenerating and reshaping said binary pulse signals, a sync pulse detection and timing averaging network connected to receive said binary pulse signals for regenerating and removing time jitter from said sync pulses, a clock generator for generating pulses at the bit rate frequency and connected to be synchronized with said regenerated sync pulses and means connecting the said pulses at the bit rate frequency to the said reshaping network to synchronize the said regenerated and reshaped binary pulse signals with the pulses at the bit rate frequency and wherein said sync pulse detection and timing averaging network comprises a tank circuit tuned to a frequency which is slightly below the sync pulse repetition rate, means connecting said binary pulse signals to said tank circuit to superimpose the binary pulse signals on the oscillations of the said tank circuit, a blocking oscillator, means for applying the combined binary pulse signals and oscillation of the said tank circuit to the said blocking oscillator to regenerate said sync pulses and means for feeding back energy from said blocking oscillator to said tank circuit to cause said oscillations.

2. A regenerative pulse repeater in accordance with claim 1, where the said binary pulse signals consist of an inverted binary pulse train, and said reshaping network comprises two blocking oscillators, one for each polarity, an input transformer to separate the positive and the negative pulses before regeneration and an output transformer to combine the regenerated pulses into an inverted binary pulse train.

3. A regenerative pulse repeater in accordance with claim 1 in which the clock generator includes a tuned circuit means for frequency stabilizing a transistor means for producing timing spikes.

4. A regenerative pulse repeater for regenerating the pulses of an input pulse train composed of constant frequency pulses with non-regular pulses between the constant frequency pulses and with every pulse in the pulse train negative with respect to the pulse it precedes comprising an input transformer connected to receive the said input pulse train, two blocking oscillators connected to opposite sides of said input transformer each of which generates a pulse when a negative pulse exceeding a predetermined limit is applied to it, an output transformer, means connecting the outputs of said two blocking oscillators to opposite sides of said output transformer to form an output pulse train in which every pulse is negative with respect to the one it precedes, a third blocking oscillator, means connecting said input transformer to said third blocking oscillator for synchronizing the output of the blocking oscillator with the said constant frequency pulses of said input pulse train, a clock generator controlled by said third blocking oscillator for generating timing pulses and means for superimposing on the said input pulse train the said timing pulses to synchronize the input pulse train with the timing pulses.

5. A regenerative pulse repeater for regenerating pulse of a pulse train said pulse train consisting of constant frequency sync pulses and pulses representing binary bits of information located between the sync pulses and with each pulse in the pulse train negative with respect to the pulse that precedes it comprising an input transformer to which said pulse train is applied, a reshaper including two blocking oscillators connected to the output of said input transformer for generating a pulse each time one of the pulses of the pulse train exceeds a predetermined amplitude, capacitive means connected to be charged each time one of the pulses of the pulse train exceeds said predetermined amplitude and connected to form a variable biasing means for said reshaper and an output transformer connected to said reshaper for inserting said generated pulses into another pulse train with each pulse negative with respect to the pulse that precedes it.

References Cited in the file of this patent

UNITED STATES PATENTS

| | | |
|---|---|---|
| 2,931,860 | Cookingham | Apr. 5, 1960 |
| 2,996,578 | Andrews | Aug. 15, 1961 |